W. B. Carpenter,
Ear-Ring,
Nº 20,480. Patented June 8, 1858.
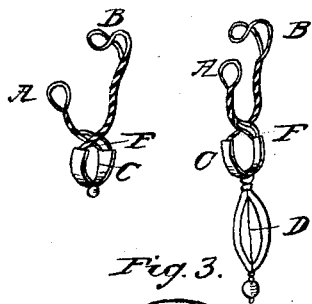
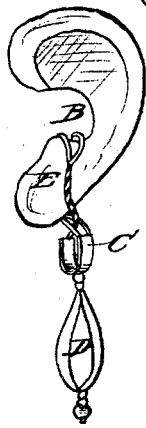
Witnesses
H. W. Collender
J. H. O'Connor
Inventor
Wm B Carpenter

UNITED STATES PATENT OFFICE.

W. B. CARPENTER, OF BROOKLYN, NEW YORK.

METHOD OF ATTACHING ORNAMENTS TO THE EAR.

Specification of Letters Patent No. 20,480, dated June 8, 1858.

*To all whom it may concern:*

Be it known that I, WM. B. CARPENTER, of Brooklyn, in the county of Kings and the State of New York, have invented a new and Improved Mode of Attaching Ornaments to the Ear without Boring or Piercing Holes in the Same; and I do hereby declare that the following is a full and exact description thereof, reference being had to the accompanying drawings and to the letters of reference marked thereon, like letters referring to like parts.

The nature of my invention consists in providing any article which is desired to be worn in the ear, as an ornament, with two peculiarly shaped wires, soldered or otherwise fastened to a spring, said spring causes the wires to hold part of the ear at or near the place at which ear rings are usually worn. The spring retains the wires upon the ear, until the said spring is pressed by the thumb and finger, when the hold of the wires is released and the ornament is readily detached.

To enable others skilled in the art to make and use my invention, I will proceed to describe its construction and operation. I construct my ear wires either plain or twisted or otherwise as the fancy may direct, simply bending them to conform to the shape of the ear, near the part where ear rings are usually attached, one of these wires is represented as being partly twisted, at B Figure 1 of the accompanying drawings, which wire B is shown, to be made considerably longer than the other wire marked A, thereby allowing the wire B to be of sufficient length to be bent at its upper part at the place marked B, which bend is somewhat hook-shaped. This part of the hook shaped wire B is intended to hook around that part of the ear which is just above and slightly back of that part of the ear at which holes are usually bored for the purpose of inserting ornaments. The shorter wire marked A is made to conform to the shape of the ear next the head, and is provided with an opening as shown at F. This opening in the wire A, is intended to allow the lower part of the wire B to pass freely through it, as shown at F; both wires A and B are soldered or otherwise connected at their lower parts, to the spring marked C, which spring is made of rolled plate and of any desired size and thickness. Several other forms of spring may be used effectually the same, but I prefer the shape of the spring to be nearly like that as shown in the accompanying drawings and marked C.

It will be seen that the wires A and B cross each other as they pass upward and obliquely. The consequence is that the said wires A and B are drawn toward each other by the inherent action of the spring C. This action causes the wires A and B to retain a fair hold of the ear when said ear at its lower part is inclosed between them. Said wires then assume the position, with relation to each other as shown in Fig. 2; but by pressing the spring C with the thumb and finger, it causes the wires A and B to recede from each other as shown at Fig. 1. This allows the wires A and B to be freely released from the ear.

The wires A and B are left more or less open at their upper parts at or near those places which are marked A and B. This is done for the purpose of distributing the pressure over a larger surface, and rendering the wearing of the same easier than would be the case if the ends were to terminate, at their upper parts closely twisted together. Said wires A and B in connection with the spring C, are constructed for the purpose of attaching themselves and the pendulous ornament D to the ear, but which ornament D is in no part my invention. And further to mark more exactly the position of the wires when placed upon the ear, reference may be had to Fig. 3, which represents the ear E, the wire B, (the wire A being partly hid beneath the under part of the ear) the spring C and the pendulous ornament D as adjusted when worn.

The advantages of these ear wires may be spoken of as follows: first, it will save many females from the painful operations of having their ears bored; 2d, they are far more comfortable to wear than the old way; 3d, they may be put on and taken off the ear with the greatest facility; 4th, many females are excessively annoyed by infants who pull at their earring, which generally results either in the breaking of the ear-ring or the ear, such an event cannot happen when my ear-wires are worn, because when a pull is given to them, which is of sufficient force to tear the ear with the old style of rings, they would pull off without injuring the ear-wires or the ear.

What I claim as my invention and desire to secure by Letters Patent, is—

5 The mode of attaching ornaments to the ear without boring or piercing holes therein, by the use of the hook-shaped wire B in connection with the wire A and the spring C substantially, and for the purpose as herein described.

WM. B. CARPENTER.

Witnesses:
H. W. COLLENDER,
I. H. O'CONNOR.